(12) United States Patent
Ashoori et al.

(10) Patent No.: US 10,042,874 B2
(45) Date of Patent: *Aug. 7, 2018

(54) SCALABLE VISUALIZATION OF A PRODUCT AND ITS VARIANTS

(71) Applicant: International Business Machines Corporation, Armonk, NY (US)

(72) Inventors: Maryam Ashoori, White Plains, NY (US); Jin Li, Markham (CA)

(73) Assignee: International Business Machines Corporation, Armonk, NY (US)

( * ) Notice: Subject to any disclaimer, the term of this patent is extended or adjusted under 35 U.S.C. 154(b) by 728 days.

This patent is subject to a terminal disclaimer.

(21) Appl. No.: 14/618,278

(22) Filed: Feb. 10, 2015

(65) Prior Publication Data

US 2015/0309710 A1 Oct. 29, 2015

Related U.S. Application Data

(63) Continuation of application No. 14/260,448, filed on Apr. 24, 2014, now Pat. No. 9,727,596.

(51) Int. Cl.
*G06F 17/30* (2006.01)
*G06F 9/451* (2018.01)
*G06F 9/44* (2018.01)

(52) U.S. Cl.
CPC .. *G06F 17/30327* (2013.01); *G06F 17/30554* (2013.01); *G06F 17/30589* (2013.01); *G06F 17/30917* (2013.01); *B60K 2350/1004* (2013.01); *G06F 9/4443* (2013.01); *G06F 9/451* (2018.02)

(58) Field of Classification Search
CPC .................. G06F 6/4443; G06F 17/30994
See application file for complete search history.

(56) References Cited

U.S. PATENT DOCUMENTS

| | | | |
|---|---|---|---|
| 6,484,149 B1 | 11/2002 | Jammes et al. | |
| 6,990,638 B2 | 1/2006 | Barksdale et al. | |
| 7,337,412 B2 | 2/2008 | Guido et al. | |
| RE41,476 E | 8/2010 | Muehleck et al. | |

(Continued)

OTHER PUBLICATIONS

IBM, "List of IBM Patents or Patent Applications Treated as Related (Appendix P)," Feb. 10, 2015.

(Continued)

*Primary Examiner* — Hung Q Pham
(74) *Attorney, Agent, or Firm* — Michael O'Keefe

(57) ABSTRACT

A method for generating a scalable visualization of a hierarchical data structure is provided. The method may include mapping at least one component within a plurality of components to the hierarchical data structure. The method may also include mapping at least one sub-component within a plurality of sub-components to the at least one mapped component. The method may further include mapping at least one variant within a plurality of variants to the hierarchical data structure as an accordion user interface widget. Additionally, the method may include mapping at least one variant component within a plurality of variant components to the at least one mapped variant as an accordion user interface widget. The method may also include mapping at least one variant sub-component within a plurality of variant sub-components to the at least one mapped variant component as an accordion user interface widget.

7 Claims, 7 Drawing Sheets

(56) References Cited

U.S. PATENT DOCUMENTS

2005/0149873 A1   7/2005  Guido et al.
2009/0187864 A1   7/2009  Bedell et al.
2010/0287512 A1  11/2010  Gan et al.
2011/0179066 A1   7/2011  Cardno et al.
2012/0120086 A1   5/2012  Dang et al.

OTHER PUBLICATIONS

Ashoori et al., "Scalable Visualization of a Product and Its Variants," filed Apr. 24, 2014, p. 1-28, U.S. Appl. No. 14/260,448.

Bashroush et al., "Visualizing Variability Models Using Hyperbolic Trees," Pre-proceedings of CAISE'11 Forum, 2011, p. 113-120, University of East London School of Computing, IT and Engineering.

IBM, "Terminology and Concepts," Managing Products and Projects, Rational Engineering Lifecycle Manager Overview, http://pic.dhe.ibm.com/infocenter/relmhelp/v1r0m0/index.jsp?topic=%2Fcom.ibm.rational.relm.doc%2Ftopics%2Fc_relm_terminology_and_concepts.html, Accessed on: Mar. 13, 2014.

Louka, "Implementation of an Interactive Visualization Tool for Analyzing Dynamic Hierarchies," Master's Thesis Nr. 3340, Commenced May 15, 2012, Completed Nov. 14, 2012, p. 1-89.

McGuffin et al., "Quantifying the Space-Efficiency of 2D Graphical Representations of Trees," 2010, École de technologie supérieure, Montréal, Canada.

Tominski et al., "Fisheye Tree Views and Lenses for Graph Visualization," Proceedings of the Information Visualization (IV'06), 2006, IEEE Computer Society.

SCALABLE VISUALIZATION OF A PRODUCT AND ITS VARIANTS

FIELD OF THE INVENTION

The present invention relates generally to the field of computing, and more particularly to hierarchical data structure.

BACKGROUND

A product and its variants may be represented in a visual manner. For example, some existing solutions to represent a product definition and its variants include, but are not limited to a tree view, a fish-eye view, a cone tree, and a tree map.

SUMMARY

According to one embodiment, a method for generating a hierarchical data structure is provided. The method may include mapping at least one component within a plurality of components to the hierarchical data structure. The method may also include mapping at least one sub-component within a plurality of sub-components to the at least one mapped component. The method may further include mapping at least one variant within a plurality of variants to the hierarchical data structure as an accordion user interface widget. Additionally, the method may include mapping at least one variant component within a plurality of variant components to the at least one mapped variant as an accordion user interface widget. The method may also include mapping at least one variant sub-component within a plurality of variant sub-components to the at least one mapped variant component as an accordion user interface widget.

According to another embodiment, a computer system generating a hierarchical data structure is provided. The computer system may include one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method. The method may include mapping at least one component within a plurality of components to the hierarchical data structure. The method may also include mapping at least one sub-component within a plurality of sub-components to the at least one mapped component. The method may further include mapping at least one variant within a plurality of variants to the hierarchical data structure as an accordion user interface widget. Additionally, the method may include mapping at least one variant component within a plurality of variant components to the at least one mapped variant as an accordion user interface widget. The method may also include mapping at least one variant sub-component within a plurality of variant sub-components to the at least one mapped variant component as an accordion user interface widget.

According to yet another embodiment, a computer program product for generating a hierarchical data structure is provided. The computer program product may include one or more computer-readable tangible storage medium and program instructions stored on at least one of the one or more tangible storage medium, the program instructions executable by a processor. The computer program product may include program instructions to map at least one component within a plurality of components to the hierarchical data structure. The computer program product may also include program instructions to may also include mapping at least one sub-component within a plurality of sub-components to the at least one mapped component. The computer program product may further include program instructions to map at least one variant within a plurality of variants to the hierarchical data structure as an accordion user interface widget. Additionally, the computer program product may include program instructions to map at least one variant component within a plurality of variant components to the at least one mapped variant as an accordion user interface widget. The computer program product may also include program instructions to map at least one variant sub-component within a plurality of variant sub-components to the at least one mapped variant component as an accordion user interface widget.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
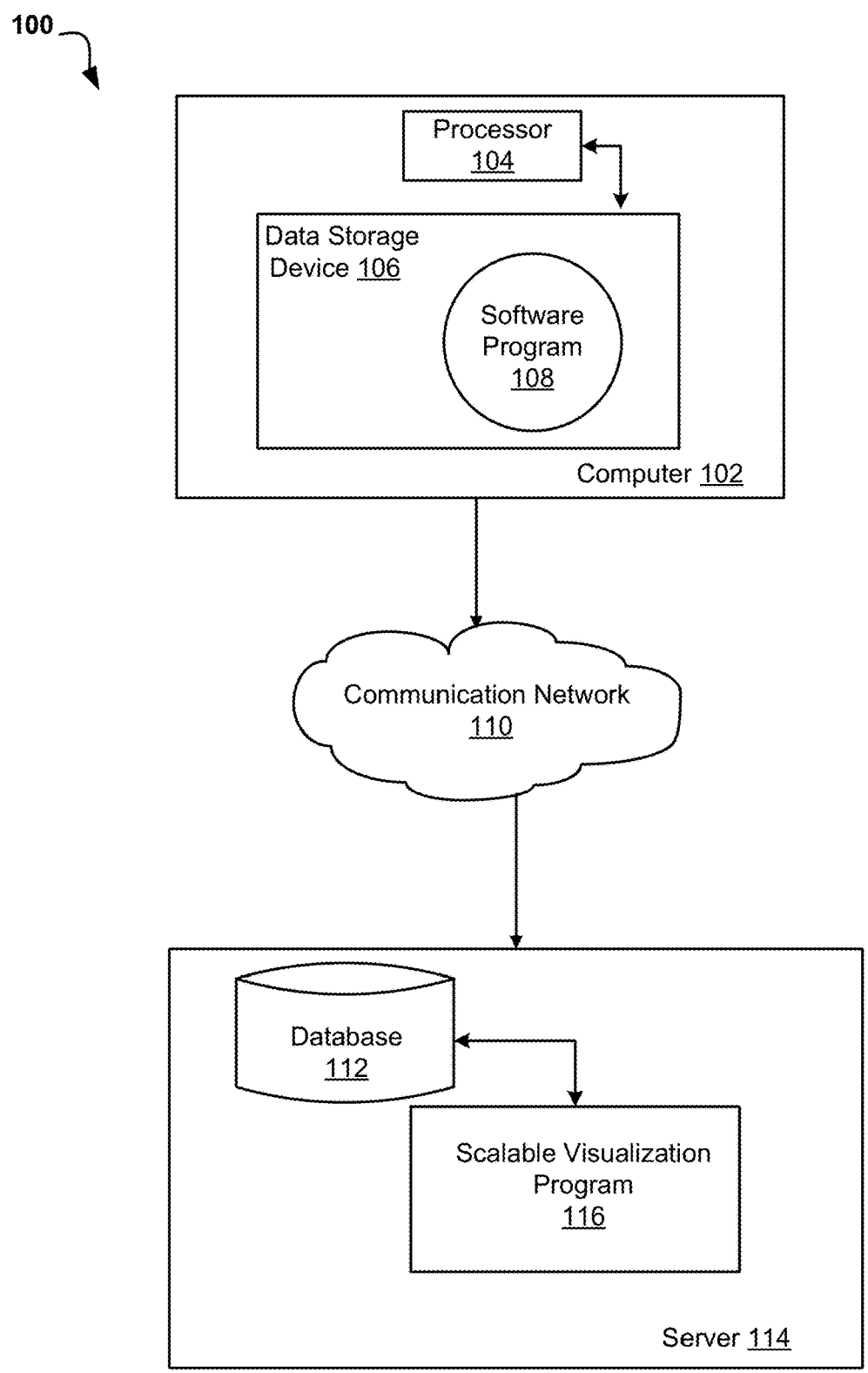
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly to hierarchical data structure. The following described exemplary embodiments provide a system, method and program product to, among other things, provide scalable visualization of a product and its variants.

As previously described, a product (i.e., a hierarchical data structure) and its variants may be represented in a visual manner, such as a tree view, a fish-eye view, a cone tree, and a tree map. The tree view may represent a product with its main components and a variant of the product identified by specific parameters. It is important for the product definition nodes to be able to represent a hierarchical structure, version selection, and parallel variants. Since a tree view may not represent the connections between the product and its variants, a hierarchical view that represents the connections between the product and its variants may be implemented to address this issue. However, both a hierarchical structure and a tree view may suffer from a scalability issue in terms of representing and navigating large information space.

As such, a fish-eye view may be implemented as a method to represent larger information space since the fish-eye view may represent the entire information space in a single overview diagram. The fish-eye view may show details for the components close to the user's current location of interest and gradually fading for the parts farther away from the user's current location. However, it may be difficult to show product variants using a fish-eye approach for hierarchical data. For example, one major component of the product may be the current focus and details of that particular component's sub-components may all be shown, but the details of other major components of the product may be hidden.

Furthermore, a cone tree may provide a 3D representation of composition. However, it may be difficult to locate items in a cone tree since it may not provide a discoverable and easy to navigate representation of the product variants. As such, a scalable solution for representing hierarchical structure may be a tree map, but a tree map may not be designed to show or provide easy navigation for variants of hierarchical data structure. Therefore, it may be advantageous, among other things, to extend the existing visualization tools for representing larger information space and address their shortcomings by providing a scalable tool for representing and navigating hierarchical data structure, version selection, and parallel variants.

According to at least one embodiment, horizontal and vertical orientations may be used to display the hierarchy of a product (i.e., component branches) and color shading and size of the hierarchical branches may be used to indicate their distance from the root. Additionally, an accordion design may be used to show product variants and allow users to easily navigate the product variants. The present embodiment may provide a scalable solution for visualizing hierarchical data by optimizing the 2D space to layout the data since a product or hierarchical data set could have thousands of components in its definition. Additionally, implementations of the present embodiment may represent a gestalt view of a product and its variants at the same time as well as support an easy identification and navigation of product variants.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to provide scalable visualization of a hierarchical data structure and its variants. According to one implementation of the present embodiment, a product and its variants may be implemented as a physical tree (i.e., a tree view) where branches represent components and the thickness of each branch may represent the distance from the root. The present invention may optimize the 2D space to compactly render the hierarchical data set. As such, the same amount of data may fit in one quarter of the space, while enabling users to see a gestalt view of the product and its variants at the same time. Furthermore, different shades of gray or color as well as the size of the boxes may indicate the distance from the top-level product. As such, users may navigate between variants by swiping to the sides (e.g., in touch interfaces) or by clicking on the variants, rendering using an accordion user interface widget at the end of a hierarchical branch box. For example, tapping on each product branch component or clicking on each product branch component may collapse or expand a product branch's components, but not the product branch's subcomponents.

Referring now to FIG. 1, an exemplary networked computer environment 100 in accordance with one embodiment is depicted. The networked computer environment 100 may include a computer 102 with a processor 104 and a data storage device 106 that is enabled to run a software program 108. The networked computer environment 100 may also include a database 112, a server 114 running a scalable visualization program 116 and a communication network 110. The networked computer environment 100 may include a plurality of computers 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with database 112 running on server computer 114 via the communications network 110. The communications network 110 may include connections, such as wire, wireless communication links, or fiber optic cables. As will be discussed with reference to FIG. 6, server computer 114 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing devices capable of accessing a network.

As previously described, the client computer 102 may access the scalable visualization program 116, running on server computer 114 via the communications network 110. For example, a user using an application program 108 (e.g., Firefox®) (Firefox and all Firefox-based trademarks and logos are trademarks or registered trademarks of Mozilla and/or its affiliates) running on a client computer 102 may connect via a communication network 110 to a database 112 and the scalable visualization program 116 which may be running on server computer 114. The scalable visualization program 116, running on server computer 114 may interact with the database 112 to display a product and its variants to the user.

As previously described, the scalable visualization program 116 may provide a scalable solution for visualizing hierarchical data by optimizing the 2D space to layout the data since a product or hierarchical data set could have thousands of components in its definition. Additionally, implementations of the present embodiment may represent a gestalt view of a product hierarchical data structure and its variants at the same time as well as support an easy identification and navigation of product variants.

Furthermore, according to at least one implementation, a user using client computer 102 may double tap (i.e., double click) on each product branch component and may expand or collapse all of the product's components and subcomponents (i.e., collapse all and expand all). Also, according to another implementation, when one or more product branch components are collapsed, users may manually (or according to yet another implementation, set an option to automatically) adjust the layout of the visible components to maximize the use of the 2D rendering space. The tree view associated with the scalable visualization program 116 is explained in further detail below with respect to FIG. 2.

Figure 2:
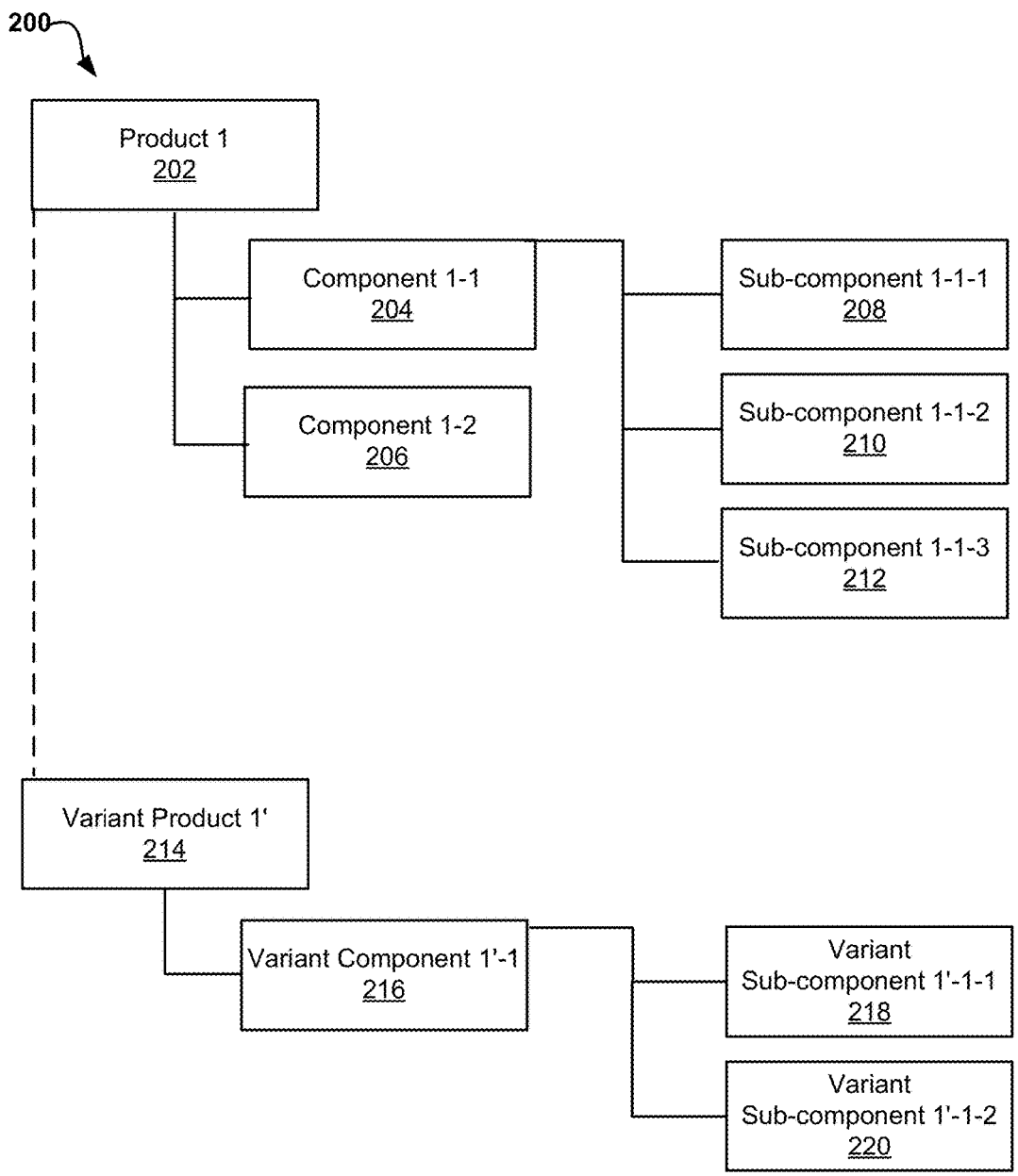
FIG. 2 illustrates a tree view of a scalable visualization of a product and its variants according to one embodiment.

Referring now to FIG. 2, a tree view of a scalable visualization of a product and its variants 200 in accordance with one embodiment is depicted. As such, the main product depicted in the tree view 200 is (Product 1) 202 with two components of (Component 1-1) 204 and (Component 1-2) 206. As shown with respect to FIG. 2, the first component (Component 1-1) 204 may have three sub-components (Sub-component 1-1-1) 208; (Sub-component 1-1-2) 210; and (Sub-component 1-1-3) 212. Additionally, the (Product 1) 202 may have a variant identified as (1'), such as (Variant Product 1') 214. Furthermore, the variant (e.g., Variant Product 1') may have its own variant components, such as (Variant Component 1'-1) 216 and variant sub-components, such as (Variant Sub-component 1'-1-1) and (Variant Sub-component 1'-1-2). According to one implementation of the present embodiment, a tree view may be converted to a tree flow via the scalable visualization program 116 (FIG. 1). The method associated with the scalable visualization program 116 (FIG. 1) is explained in further detail below with respect to FIG. 3.

Figure 3:
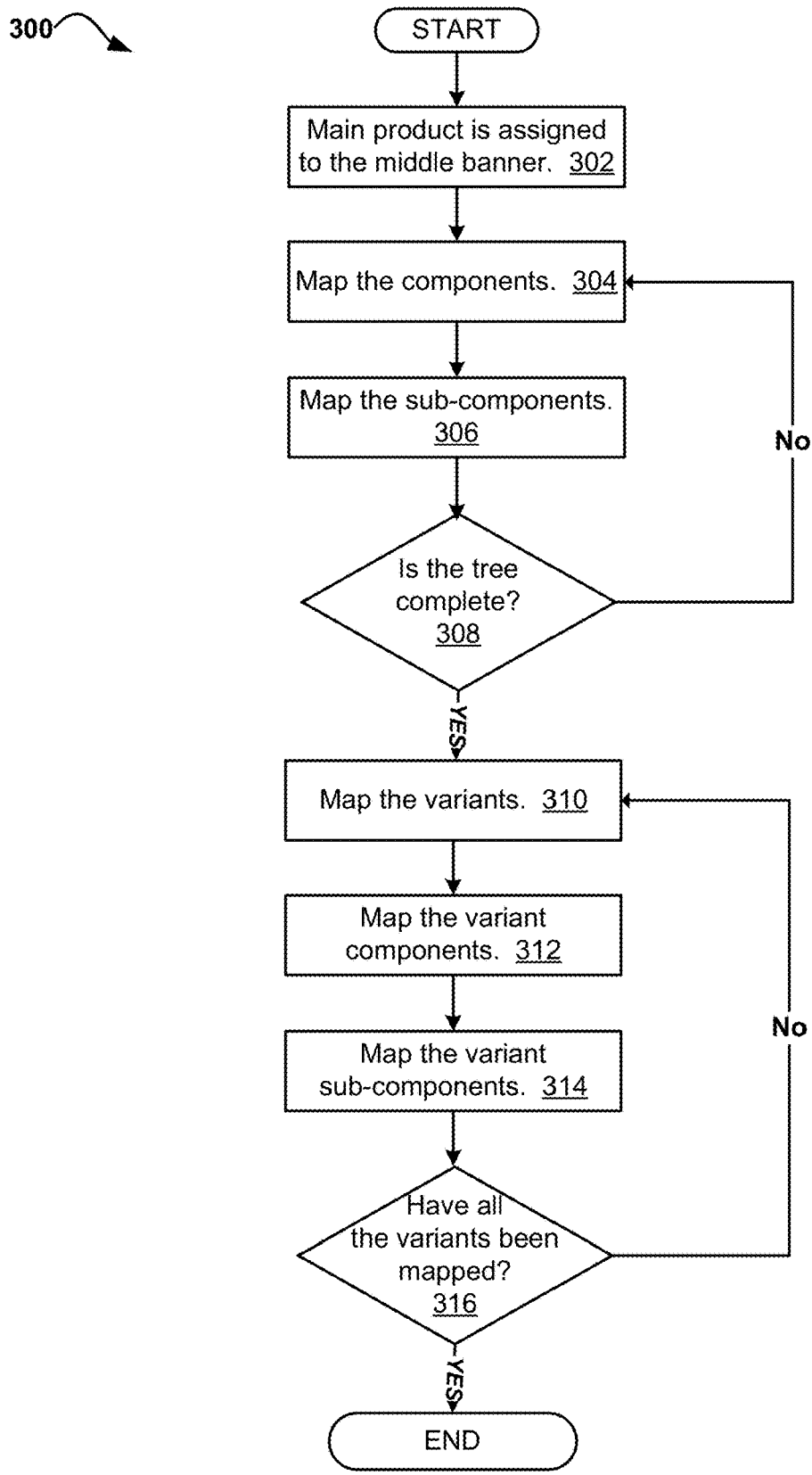
FIG. 3 is an operational flowchart illustrating the steps carried out by a program to build a hierarchical data structure and its variants according to at least one embodiment.

Referring now to FIG. 3, an operational flowchart 300 illustrating the steps carried out by a program to build a scalable visualization of a hierarchical data structure (i.e., a product) and its variants according to at least one embodiment is depicted. According to one implementation, a tree view may be converted to a tree flow by starting from the product level. Therefore, at 302, the main product (i.e., the product) is assigned to the middle banner. As such, the product may be assigned to a middle banner with respect to a tree view. For example, since (Product 1) 202 (FIG. 2) is the main product (i.e., the root level node in the hierarchical data structure), (Product 1) 202 (FIG. 2) may be assigned to the middle banner. As another example, with respect to FIG. 4, the product, 'Model_T' is the main product (i.e., the root level node in the hierarchical data structure) and as such, is assigned to the middle banner 402.

Next, at 304, the components are mapped. According to one implementation, the components of the product (i.e., the hierarchical data structure) may be mapped to the product and as such, assigned a vertical box. For example, (Component 1-1) 204 (FIG. 2) and (Component 1-2) 206 (FIG. 2) may be mapped to (Product 1) 202 (FIG. 2) and vertical boxes may be assigned to (Component 1-1) 204 (FIG. 2) and (Component 1-2) 206 (FIG. 2). With respect to FIG. 5A, Component 'Braking System' 510 and Component 'Interior' 504 may be mapped to the Product 'Model_T' 402 and as such vertical boxes may be assigned to Component 'Braking System' 510 and Component 'Interior' 504. Additionally, according to at least one implementation of the present embodiment, the width (i.e., the size) of the boxes may decrease based on the distance from the root (i.e., a top-level product, such as Product 'Model_T' 402 (FIG. 5A)). As such, according to one implementation, the width of the boxes may decrease as the boxes are farther from the root. Furthermore, the shading of the vertical boxes and the color of the vertical boxes may also indicate the distance from the root.

Then at 306, the sub-components may be mapped. As such, according to one implementation, the sub-component may be mapped to the components as horizontal boxes with smaller widths and lighter shades. For example, (Sub-component 1-1-1) 208 (FIG. 2); (Sub-component 1-1-2) 210 (FIG. 2); and (Sub-component 1-1-3) 212 (FIG. 2) may be mapped to (Component 1-1) 204 (FIG. 2) and assigned horizontal boxes with smaller widths and lighter shades. According to one implementation of the present embodiment, the Sub-components 1-1-1, 1-1-2 and 1-1-3 may be rendered as horizontal boxes since the immediate parent node associated with a Sub-component (e.g., (Component 1-1)) in the hierarchical data structure is rendered as vertical box. Therefore, when traversing through the nested levels of nodes in the hierarchical data structure, the present embodiment may alternate between vertical and horizontal boxes for the nested levels of nodes. With respect to FIG. 5A, Sub-component 'Dashboard' 506 is mapped to Component 'Interior' 504 and is assigned a horizontal box. Additionally, according to at least one implementation of the present embodiment, the size of the horizontal boxes, the shading of the horizontal boxes and the color of the horizontal boxes may indicate the distance from the root (i.e., a top-level product, such as Product 'Model_T' 402 (FIG. 5A)).

Next, at 308, it is determined whether the tree is complete. If it is determined at 308 that the tree is not complete, then the method may continue back to step 304, as previously described, to map the components. However, if it is determined at 308 that the tree is complete, then the method may continue to step 310.

Then at 310, the variants of the product are mapped. A product variant is a different version of the product, such as differing sizes, differing colors, etc. As such, the product variants, such as (Variant Product 1') 214 (FIG. 2) may be mapped as an accordion extension to the root bar of the product (Product 1) 202 (FIG. 2). According to one implementation of the present embodiment, users may navigate between variants by swiping to the sides (in touch interfaces) or by clicking on the variants using an accordion user interface (UI) widget located at the end of a hierarchical branch box. For example, with respect to FIG. 4, users may navigate between variants 404 by swiping to the sides (in touch interfaces) or by clicking on the variants 404, rendering, using an accordion interface widget 406, at the end of the hierarchical branch box 402.

Then, at 312, the variant components are mapped. Therefore, the variant components, such as (Variant Component 1'-1) 216 (FIG. 2) may be mapped to the (Component 1-1) 204 (FIG. 2) as an accordion user interface widget.

Next at 314, the variant sub-components are mapped to the product sub-components as an accordion user interface widget. For example, with respect to FIG. 2, (Sub-component 1'-1-1) 218; and (Sub-component 1'-1-2) 220 would be respectively mapped as an accordion user interface (UI) widget to the (Sub-component 1-1-1) 208; and (Sub-component 1-1-2) 210 (FIG. 2) that may allow a user to flip through the variants.

Then at 316, it is determined whether all the variants have been mapped. If it is determined at 316 that all the variants have not been mapped, then the method may continue back to step 310, as previously described, to map the variants. However, if it is determined at 310 that all the variants have been mapped, then the method may end.

It may be appreciated that FIG. 3 provides only an illustration of one implementation and does not imply any limitations with regard to how different embodiments may be implemented. Many modifications to the depicted environments may be made based on design and implementation requirements.

Figure 4:
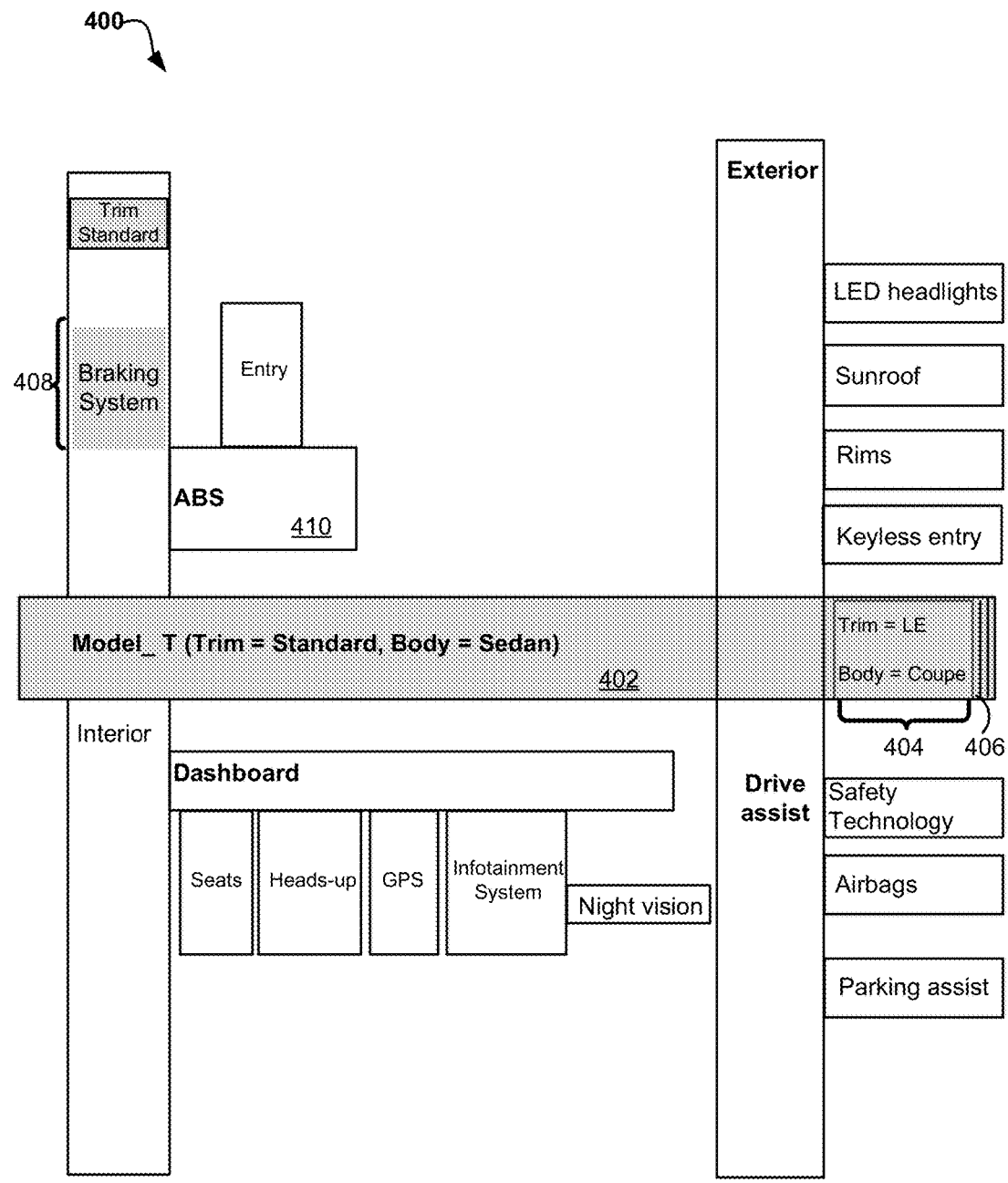
FIG. 4 illustrates an exemplary scalable visualization technique according to one embodiment.

Referring now to FIG. 4, an exemplary scalable visualization technique 400 in accordance with one embodiment is depicted. As previously described, the present embodiment may optimize the 2D space to compactly render the hierarchical data set. As such, the same amount of data may fit in ¼ of the space. As depicted in FIG. 4, users may be enabled to see a gestalt view of 'Model-T' 402 and its variants 404 at the same time. According to at least one implementation, different colors, such as different shades of gray, as well as the size of the boxes may indicate the distance from the top-level product. Additionally, users may navigate between variants 404 by swiping to the sides (in touch interfaces) or by clicking on the variants 404, rendering, using an accordion user interface (UI) widget 406, at the end of a hierarchical branch box 402. For example, a user may swipe the accordion user interface (UI) widget 406 to navigate between the variants, such as "ABS" 410 for the "Braking System" 408.

Additionally, FIG. 4 (in conjunction with FIGS. 5A-5B) may illustrate how a user may expand or collapse components and sub-components in the product (i.e., the hierarchical data structure). As such, according to one implementation, a user may tap (or click) on each product branch component (i.e., component) 504 to collapse or expand its sub-components. For example, if a user clicked on the branch component 'interior' 504, the Sub-component 'dashboard' box 506 as the only child may be expanded and shown. Subsequently, if a user clicked on the Sub-component 'dashboard' 506, all of its children in box 508 may be expanded and shown. However, if the user clicked on the branch component 'interior' 504 again, then the 'dashboard' component 506 may be hidden. When 'dashboard' component 506 is hidden, all of its children (that is, the entire hierarchy contained inside the 'dashboard' component 506) will be hidden as well.

Furthermore, double tapping or double clicking on each product branch component 504 may expand or collapse all of the product branch's 504 components 506 and subcomponents 508 (i.e., collapse all and expand all). For example, if a user double clicked on 'interior' 504, the 'dashboard' box 506 and all the subcomponents 508 on that sub-tree may be expanded. As such, when one or more product branch components 506 are collapsed, a user may manually (or according to another implementation, set an option to automatically) adjust the layout of the visible components to maximize the use of the 2D rendering space. For example, when a user collapses the 'braking system' 510, 'exterior' 512, and 'drive assist' 514 components, the product data visualization associated with the present embodiment may be adjusted to make more space to render 'interior' product branch component 504, which is the only remaining visible top-level component.

Figure 5A:
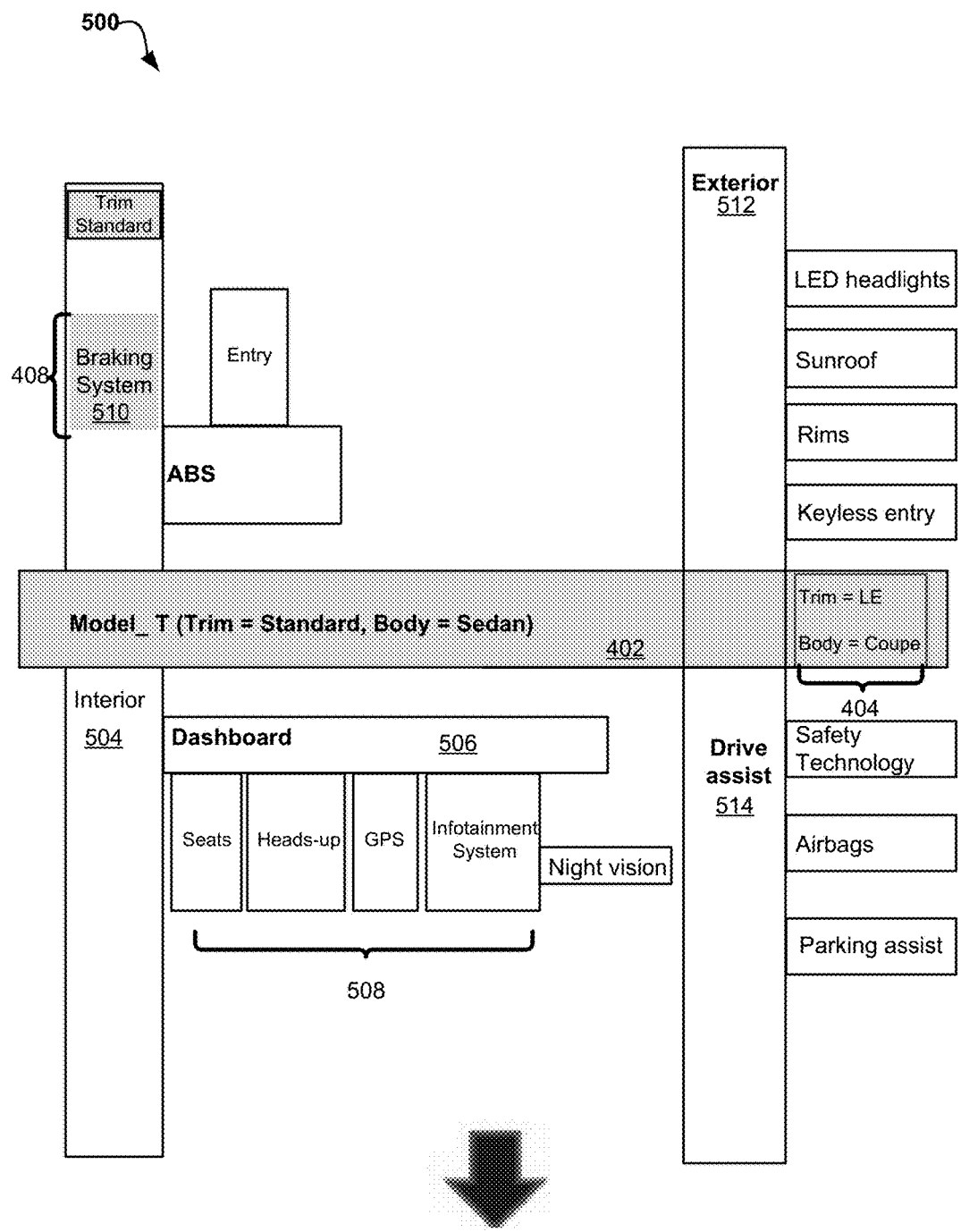
FIGS. 5A-5B illustrate an exemplary scalable visualization technique according to one embodiment.
Figure 5B:
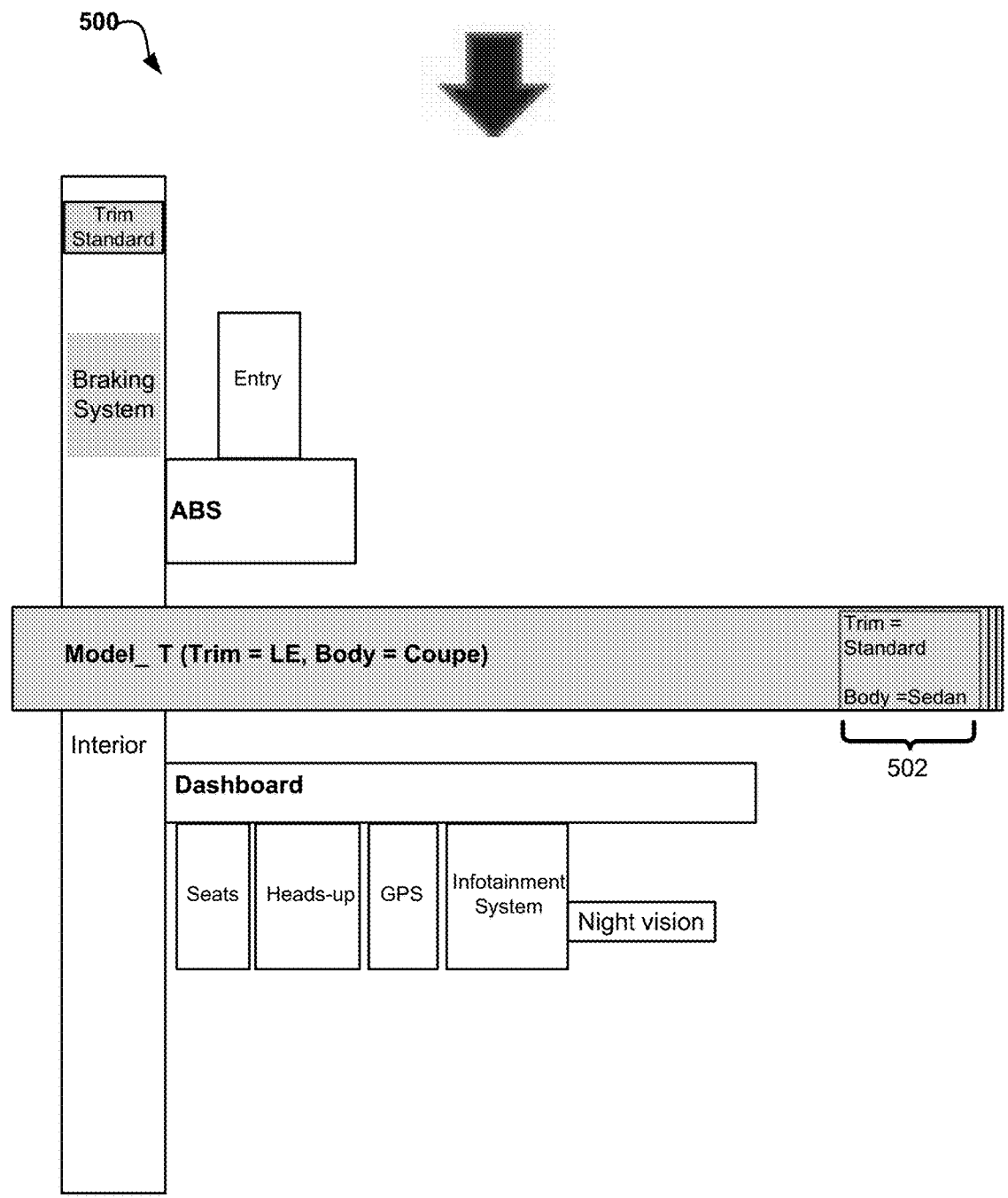

Referring now to FIGS. 5A-5B, an exemplary scalable visualization technique 500 in accordance with one embodiment is depicted. FIGS. 5A-5B illustrate how a user may change and navigate between two variants of the 'Model T' Product 402, from 'Model T (body=Coupe, trim=LE)' 404 to 'Model T (body=Sedan, trim=Standard)' 502. According to one implementation of the present embodiment, users may navigate between two variants of the 'Model T' Product 504, from 'Model T (body=Coupe, trim=LE)' 404 to 'Model T (body=Sedan, trim=Standard)' 502 by swiping to the sides (in touch interfaces) or by clicking on the variants using an accordion user interface (UI) widget located at the end of a hierarchical branch box 404. Users may keep swiping using the accordion UI widget box 406 to switch between the available variants at the 'Model T' Product 402 level.

Figure 6:
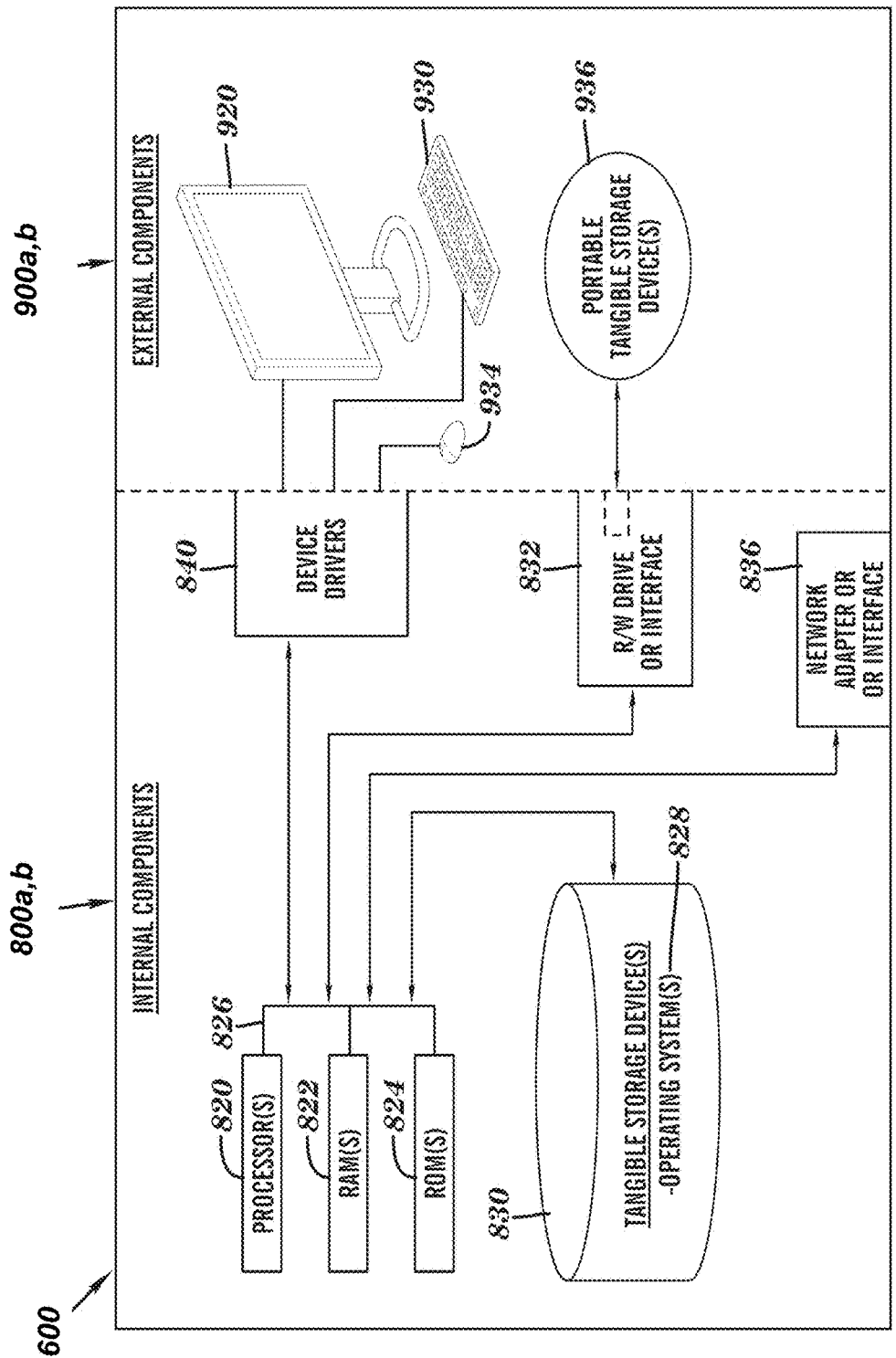
FIG. 6 is a block diagram of internal and external components of computers and servers depicted in FIG. 1 according to at least one embodiment.

FIG. 6 is a block diagram 600 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 114 (FIG. 1) may include respective sets of internal components 800a, b and external components 900a, b illustrated in FIG. 6. Each of the sets of internal components 800a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and software programs 108 (FIG. 1) in client computer 102 is stored on one or more of the respective computer-readable tangible storage medium 830 for execution by one or more of the respective processors 820 via one or more of the respective RAMs 822 (which typically include cache memory). In the embodiment illustrated in FIG. 6, each of the computer-readable tangible storage medium 830 is a magnetic disk storage device of an internal hard drive. Alternatively, each of the computer-readable tangible storage medium 830 is a semiconductor storage device such as ROM 824, EPROM, flash memory or any other computer-readable tangible storage device that can store a computer program and digital information.

Each set of internal components 800a, b also includes a R/W drive or interface 832 to read from and write to one or more portable computer-readable tangible storage medium 936 such as a CD-ROM, DVD, memory stick, magnetic tape, magnetic disk, optical disk or semiconductor storage device. A software program 108, such as scalable visualization program 116 or Firefox® (Firefox and all Firefox-based trademarks and logos are trademarks or registered trademarks of Mozilla and/or its affiliates) can be stored on one or more of the respective portable computer-readable tangible storage medium 936, read via the respective R/W drive or interface 832 and loaded into the respective hard drive 830.

Each set of internal components 800a, b also includes network adapters or interfaces 836 such as a TCP/IP adapter cards, wireless Wi-Fi interface cards, or 3G or 4G wireless interface cards or other wired or wireless communication links. The software program 108 in client computer 102 and scalable visualization program 116 in server computer 114 can be downloaded to client computer 102 and server computer 114, respectively from an external computer via a network (for example, the Internet, a local area network or other, wide area network) and respective network adapters or interfaces 836. From the network adapters or interfaces 836, the code software program 108 in client computer 102 and the scalable visualization program 116 in server computer 114 are loaded into the respective hard drive 830. The network may comprise copper wires, optical fibers, wireless transmission, routers, firewalls, switches, gateway computers and/or edge servers.

Each of the sets of external components 900a, b can include a computer display monitor 920, a keyboard 930, and a computer mouse 934. External components 900a, b can also include touch screens, virtual keyboards, touch pads, pointing devices, and other human interface devices. Each of the sets of internal components 800a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating a scalable visualization by generating a hierarchical data structure via an interactive software application associated with a computer, the method comprising:
    selecting, by a user, a product branch component from a scalable visualization of a hierarchical data structure using a scalable visualization program, wherein the scalable visualization of the hierarchical data structure is generated by:
        mapping at least one component within a plurality of components associated with the product branch component to the hierarchical data structure;
        mapping a plurality of sub-components to the at least one mapped component;
    mapping at least one variant within a plurality of variants to the hierarchical data structure as a first accordion user interface widget;
        mapping at least one variant component within a plurality of variant components to the at least one mapped component as a second accordion user interface widget;
        mapping at least one variant sub-component within a plurality of variant sub-components to at least one mapped sub-component as a third accordion user interface widget;
    assigning a root level node to a middle banner, wherein the middle banner displays the root level node, and wherein the root level node corresponds to the at least one component of the hierarchical data structure, and wherein the root level node is associated with the product branch component to be displayed on the computer as the middle banner;
    assigning a plurality of vertical boxes to the plurality of components associated with the product branch component, including the at least one component of the hierarchical data structure, wherein the plurality of vertical boxes have a width that is determined by a distance of the plurality of components associated with the root level node from the root level node;
    assigning a plurality of horizontal boxes to the plurality of subcomponents, including the first accordion user interface widget, the second accordion user interface widget, and the third accordion user interface widget, wherein the assigned plurality of horizontal boxes has a horizontal width associated with the plurality of horizontal boxes based on a distance of the plurality of subcomponents that is determined from the root level node; and
    in response to the selected product branch component, displaying, on the computer, the scalable visualization of the hierarchical data structure comprising the middle banner, the plurality of vertical boxes, and the plurality of horizontal boxes,
    wherein the scalable visualization of the hierarchical data structure is navigated by a swiping motion on a touch surface associated with the computer or by clicking on the first accordion user interface widget, the second accordion user interface widget, or the third accordion user interface widget, and
    wherein a plurality of visible layout components associated with the displayed scalable visualization of the hierarchical data structure is automatically adjusted to maximize a use of a 2D rendering space by increasing the 2D rendering space associated with the displayed scalable visualization of the hierarchical data structure.

2. The method of claim 1, further comprising:
    assigning a vertical box to the at least one mapped component; and
    assigning a horizontal box to the at least one mapped sub-component.

3. The method of claim 2 further comprising;
    assigning a shading to the assigned vertical box;
    assigning a shading to the assigned horizontal box;
    assigning a color to the assigned vertical box;
    assigning a color to the assigned horizontal box;
    assigning a size to the assigned vertical box and
    assigning a size to the assigned horizontal box.

4. The method of claim 1, wherein the scalable visualization of the hierarchical data structure comprises a tree view.

5. The method of claim 4, wherein the tree view comprises at least one branch representing the at least one mapped component.

6. The method of claim 4, wherein the tree view comprises an optimization of a 2D space to compactly render a hierarchical data set.

7. The method of claim 3, wherein the assigned shading, the assigned color and the assigned size indicate a distance from the root level node.

\* \* \* \* \*